(12) United States Patent
Voldman

(10) Patent No.: US 6,487,571 B1
(45) Date of Patent: Nov. 26, 2002

(54) METHOD AND SYSTEM FOR GENERATING ACTUAL RANDOM NUMBERS WITHIN A MULTIPROCESSOR SYSTEM

(75) Inventor: Jean Voldman, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,098

(22) Filed: Oct. 7, 1999

(51) Int. Cl.[7] .................................................. G06F 1/02
(52) U.S. Cl. ........................................ 708/250; 708/255
(58) Field of Search .............................. 708/250, 255, 708/256; 380/46

(56) References Cited

U.S. PATENT DOCUMENTS

| | | | |
|---|---|---|---|
| 4,819,818 A | * | 4/1989 | Simkus et al. ................ 463/22 |
| 4,944,009 A | | 7/1990 | Micali et al. |
| 5,365,466 A | * | 11/1994 | Hazard ....................... 708/250 |
| 5,515,307 A | | 5/1996 | Aiello et al. |
| 5,602,845 A | * | 2/1997 | Wahl .......................... 370/395 |
| 5,732,138 A | | 3/1998 | Noll et al. |
| 5,778,069 A | | 7/1998 | Thomlinson et al. |
| 5,784,553 A | | 7/1998 | Kolawa et al. |
| 6,072,823 A | * | 6/2000 | Takakusaki ................. 708/250 |
| 6,215,874 B1 | * | 4/2001 | Borza et al. .................. 380/46 |
| 6,389,439 B1 | * | 5/2002 | Mitsunaga et al. ......... 708/250 |

* cited by examiner

Primary Examiner—Chuong Dinh Ngo
(74) Attorney, Agent, or Firm—Bracewell & Patterson, LLP

(57) ABSTRACT

A method for generating actual random numbers within a multiprocessor system is disclosed. A first processing thread is continuously writing to a shared memory space while a second processing thread is continuously reading from the same shared memory space without utilizing a locking mechanism for synchronizing the two processing threads. Preferably, each of the processing threads is executed on a separate processing unit. An actual random number can then be generated from the data read from the shared memory space by the second processing thread.

6 Claims, 2 Drawing Sheets

METHOD AND SYSTEM FOR GENERATING ACTUAL RANDOM NUMBERS WITHIN A MULTIPROCESSOR SYSTEM

BACKGROUND OF THE INVENTION

1. Technical Field

The present invention relates to a method and system for data processing in general, and in particular to a method and system for generating random numbers. Still more particularly, the present invention relates to a method and system for generating actual random numbers within a multiprocessor system.

2. Description of the Prior Art

Random number generators can be commonly found in electronic gaming devices, such as poker, roulette, and slot machines, in which randomness is critically important to ensure fairness of a game. There are several important and desirable characteristics when designing a random number generator. First, every possible choice in the designated range of numbers must be obtainable. Second, the probability of a number appearing should be the same as the probability of any other number. Third, the occurrence of a number does not favor or disfavor the occurrence of any other number. Fourth, there should be a long period before random number permutations begin to recycle, if such is necessary. Finally, minimal hardware should be required.

Computers have long been used to implement random number generator algorithms for generating random numbers. However, the prior art random number generator algorithms seldom, if even, have all the above-mentioned characteristics. In fact, many prior art random number generator algorithms always provide pseudo random numbers instead of real random numbers, meaning although the sequence of numbers produced appears to be random, the sequence is repeatable. Moreover, due to certain constraints associated with the register size of a computer, many random number generator algorithms are not able to generate random numbers with long recycle periods without an increase in complexity to a point where generation of real random numbers becomes unacceptably expensive. Consequently, it would be desirable to provide an improved method and system for generating actual random numbers.

SUMMARY OF THE INVENTION

In accordance with a preferred embodiment of the present invention, a first processing thread is continuously writing to a shared memory space while a second processing thread is continuously reading from the same shared memory space without utilizing a locking mechanism for synchronizing the two processing threads. Preferably, each of the processing threads is executed on a separate processing unit. A real random number can then be generated from the data read from the shared memory space by the second processing thread.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of multiprocessor systems under a number of different operating systems. The multiprocessor systems may be, for example, a personal computer, a mid-range computer, or a mainframe computer. In addition, the multiprocessor system may be a stand-alone system or part of a network such as a local-area network (LAN) or a wide-area network (WAN).

Figure 1:
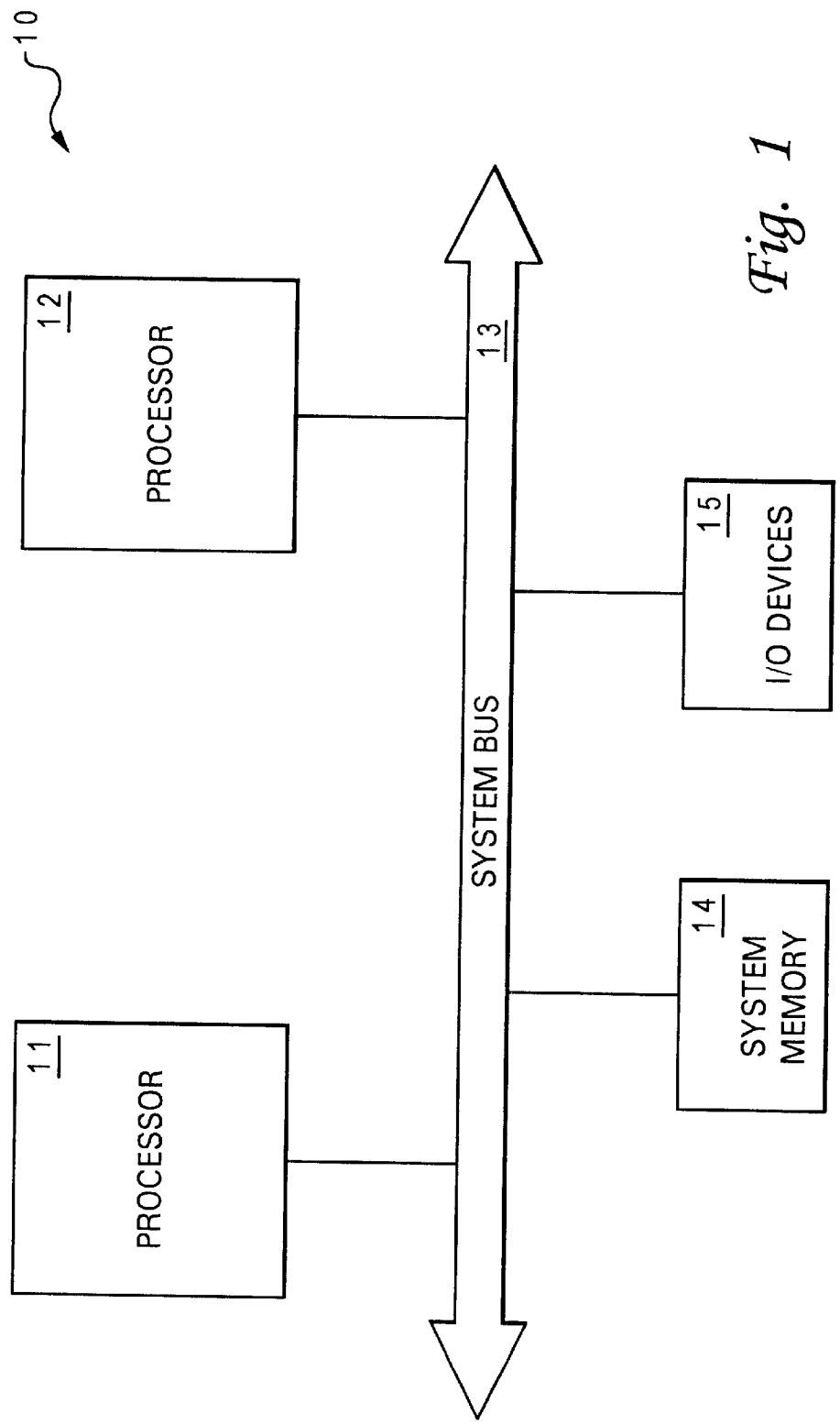
FIG. 1 is a block diagram of a multiprocessor system that may be utilized to implement a preferred embodiment of the present invention.

Referring now to the drawings and in particular to FIG. 1, there is illustrated a block diagram of a multiprocessor system that may be utilized to generate real random numbers in accordance with a preferred embodiment of the present invention. As shown, a multiprocessor system 10 includes a first processor 11 and a second processor 12. Both processor 11 and processor 12 are preferably but not necessarily identical in every aspect and are connected to a system bus 13. Also attached to system bus 13 are a system memory 14 and input/output devices 15. Input/output devices 15 may include a floppy drive, a hard drive, a keyboard, a video monitor, etc., which are well-known to those skilled in the art.

In a multiprocessing (or multi-threaded) environment, a processing thread may generally access a target object in a shared memory only if the processing thread is sure that the target object is under its exclusive control, at least temporarily during access. Thus, all operations on the target object can be ensured to be atomic and interference-free with respect to all other processing threads. In order to obtain and advertise exclusive control over a target object, a processing thread may hold a lock object. Once the processing thread has control over the target object, other processing threads will have to wait until the lock object is released, assuming that all processing threads observe the same rules. The lock object should be released immediately by the controlling processing thread when the lock object is no longer needed in order to prevent processing delays.

When lock objects are not utilized in a multiprocessing environment, it is most likely that dire consequences, such as inconsistent or unpredictable results, will occur. Thus, it typically would have been a programming error to have two processing threads working on the same memory cell of a shared memory without having the two processing threads synchronized by using a locking mechanism. The present invention turns the "mistake" of not using a lock object for synchronization on its head, and utilizes the "mistake" to generate real random numbers.

As a preferred embodiment of the present invention, a real and non-repeatable sequence of random numbers can be generated by using the inconsistency and unpredictability that arise from modifying the same cell in a shared memory by more than one processing thread without the protection offered by the use of a lock object. The unpredictability of the contents within the shared memory cell is the source of a actual and non-repeatable sequence of random numbers. Each of the processing threads is executed in a separate processing unit.

Figure 2:
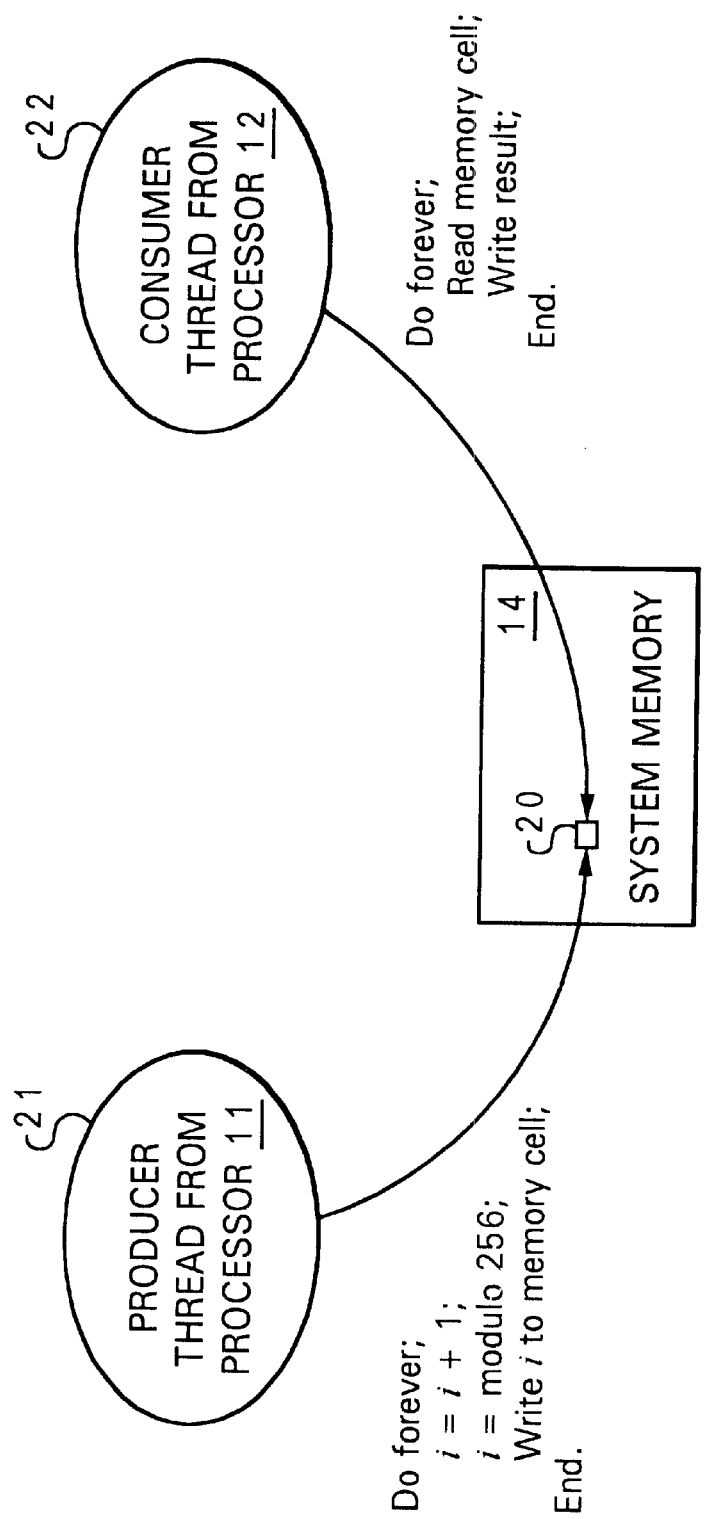
FIG. 2 is a pictorial depiction of a method for generating real random numbers, in accordance with a preferred embodiment of the present invention.

With reference now to FIG. 2, there is illustrated a pictorial depiction of a method for generating actual random numbers, in accordance with a preferred embodiment of the present invention. As shown, a cell 20 from system memory 14 that is shared by processors 11, 12 (from FIG. 1) is simultaneously accessed by a producer thread 21 and a consumer thread 22, respectively, from each of processors 11, 12, without using a lock object. Producer thread 21 writes a sequence of numbers, for example, consecutively from 0 to 255, to cell 20. At the same time, consumer thread 22 reads the contents from cell 20 and delivers the read contents as random numbers.

An example of a real random number algorithm based on the preferred embodiment of the present invention, written in Java, is shown as follows.

Two processing threads are utilized in the exemplary real random number algorithm shown above. The essence of the algorithm is to allow one of the two processing threads to independently and continually produce numbers from 0 to 255, and to store each successively produced number in a memory cell that is shared by both processing threads, while allowing the other processing thread to read what is in the shared memory cell, without the benefit of multiprocessing lock serialization.

As has been described, the present invention provides an improved method for generating actual random numbers. The random numbers are generated by using the inconsistency and unpredictability arose from modifying the same

```
public class SharedCell {
    public static void main (String[ ]args)           //start main procedure
    {
        HoldInteger h = new HoldInteger();            //Instantiaties object h
        ProduceInteger p = new ProduceInteger (h);    //Instantiaties Producer thread p
        ConsumeInteger c = new ConsumeInteger (h);    //Instantiaties Consumer thread c
        p.start();                                    //Start thread p
        c.start();                                    //Start thread c
            }
    }
}
class ProduceInteger extends Thread {                 //defines Producer thread
    private HoldInteger pHold;                        //defines local variable pHold of type HoldInteger
    public ProduceInteger (HoldInteger h)             //Constructor for Class ProduceInteger
    {
        pHold = h;                                    //Instance variable pHold is "constructed" by
                                                      //this constructor to refer the HoldInteger
                                                      //object h that was passed as an argument.
                                                      //the "=" sign semantics is that of identity
                                                      //not that of assignment
    }
    public void run ()                                //definition of content of method run;
    {
        int i,j;
        for (j=1; j<1000000; j++){                    //main loop producing integers between 0 and 255
            for (i=0; i<256; i++){
                pHold.setSharedInt (i);               //Method setSharedInt assigns the current number i
                                                      //to variable pHold;
            }
        }
    }
}
class ConsumeInteger extends Thread{
    private HoldInteger cHold;
    public ConsumeInteger (HoldInteger h)   //Constructor for class ProduceInteger
    {
        cHold = h;
    }
    public void run()
    {
        int val, i;
        int cardinal = 1000;                //variable "cardinal"defines the number of random
            numbers
        char hex;                           //that will be produced in the output file
                                            //variable "hex" defines the output byte
        for (i=1; i<=cardinal; i++){
            val = cHold.getSharedInt();     //Content of shared variable h is assigned to "val"
            hex = (char) val;               //Integer "val" is explicitly converted to a byte
            System.out.print (hex);         //(casted)Byte "hex" is put in the output stream
                                            //using built-in method of class system.
        }
    }
}
class HoldInteger {                         //define class of shared integers
    private int sharedInt;                  //define local/private variable sharedInt;
    public void setSharedInt(int val)       //Method assigns value of argument to shared integer
    {sharedInt = val;}
    public int getSharedInt()               //Method returns/gets value in shared integer
    {return sharedInt;}
}
``` cell in a shared memory by more than one processing thread without the protection offered by the use of a locking mechanism. The randomness of the numbers may depend on the range size of the numbers need to be generated and the difference in processing rate between the processing threads.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for generating actual random numbers within a multiprocessor system, said method comprising the steps of:
   continually writing to a shared memory space by a first processing thread; and
   generating an actual random number by reading said shared memory space by a second processing thread without utilizing a lock object to synchronize write and read accesses of said first and second processing threads.

2. The method according to claim 1, wherein said shared memory space is within a shared system memory.

3. A multiprocessor system for generating actual random numbers, comprising:
   a first processing thread for continually writing to a shared memory space; and
   means for generating an actual random number by reading said shared memory space by a second processing thread without utilizing a lock object to synchronize write and read accesses of said first and second processing threads.

4. The multiprocessor system according to claim 3, wherein said shared memory space is within a shared system memory.

5. A computer program product residing on a computer usable medium for generating actual random numbers within a multiprocessor system, said computer program product comprising:
   program code means for continually writing to a shared memory space via a first processing thread; and
   program code means for generating an actual random number by reading said shared memory space by a second processing thread without utilizing a lock object to synchronize write and read accesses of said first and second processing threads.

6. The computer program product according to claim 5, wherein said shared memory space is within a shared system memory.

* * * * *